United States Patent
Sprinkle

(10) Patent No.: US 6,238,476 B1
(45) Date of Patent: May 29, 2001

(54) METHOD OF CURING DRYWALL COMPOUND

(76) Inventor: Mark A. Sprinkle, 2644 Shenandoah Ave., Charlotte, NC (US) 28205

( * ) Notice: Subject to any disclaimer, the term of this patent is extended or adjusted under 35 U.S.C. 154(b) by 0 days.

(21) Appl. No.: 09/334,139

(22) Filed: Jun. 15, 1999

Related U.S. Application Data

(60) Provisional application No. 60/090,510, filed on Jun. 24, 1998, now abandoned.

(51) Int. Cl.$^7$ ............................. C04B 11/00; C04B 11/02
(52) U.S. Cl. ..................... 106/772; 106/645; 106/646; 106/650; 106/651; 106/653; 106/654; 106/674; 106/675; 106/678; 106/680; 106/735; 106/736; 106/788; 106/792; 106/796; 106/799
(58) Field of Search ................................. 106/645, 646, 106/650, 651, 653, 654, 674, 675, 678, 680, 735, 736, 772, 788, 792, 796, 799

(56) References Cited

U.S. PATENT DOCUMENTS

| | | | | |
|---|---|---|---|---|
| 2,820,714 | * | 1/1958 | Schneiter et al. | 106/785 |
| 4,238,239 | * | 12/1980 | Brown | 106/111 |
| 4,746,365 | * | 5/1988 | Babcock et al. | 106/104 |
| 5,026,576 | * | 6/1991 | Benvenuto et al. | 427/355 |
| 5,079,042 | * | 1/1992 | Frings | 427/403 |
| 5,277,712 | * | 1/1994 | McInnis | 106/774 |
| 5,334,243 | * | 8/1994 | Hyman | 106/794 |
| 5,336,318 | * | 8/1994 | Attard et al. | 106/780 |
| 5,512,616 | * | 4/1996 | Podlas | 524/18 |
| 5,746,822 | * | 5/1998 | Espinoza et al. | 106/785 |
| 5,779,786 | * | 7/1998 | Patel | 106/781 |

\* cited by examiner

Primary Examiner—Elizabeth D. Wood
(74) Attorney, Agent, or Firm—Christopher C. Dremann

(57) ABSTRACT

A method of reducing the curing time of drywall joint compound, and thereby reducing the time required to finish drywall joints or to repair plaster walls, includes adding a predetermined amount of a drying agent to a conventional ready-mixed drywall joint compound. The drying agent preferably comprises at least one compound selected from the group of compounds consisting of plaster of Paris, calcium carbonate, gypsum, crystallized silicon dioxide (quartz), Portland cement, perlite, lime, hydroxy ethyl ether of cellulose, polyvinyl alcohol, starch, wood fiber, potassium naphthalene sulfon, aluminum sulfate, sodium citrate, ammonium tartrate, hydrolyzed protein, monosodium phosphate, sodium naphthalene sulfonate, potassium sulfate and various trace materials, or mixtures thereof A sufficient amount of water is added to the drying agent to facilitate mixing the drying agent with the drywall joint compound to form a joint compound mixture. The joint compound mixture may then be applied to drywall or to a plaster wall in a manner that is well known in the art and will cure in a relatively short period of time so that subsequent coats of joint compound mixture may be added without significant delay. Furthermore, the method of the present invention allows the joint compound mixture to be smoothed after application to the drywall or to the plaster wall without sanding.

17 Claims, 1 Drawing Sheet

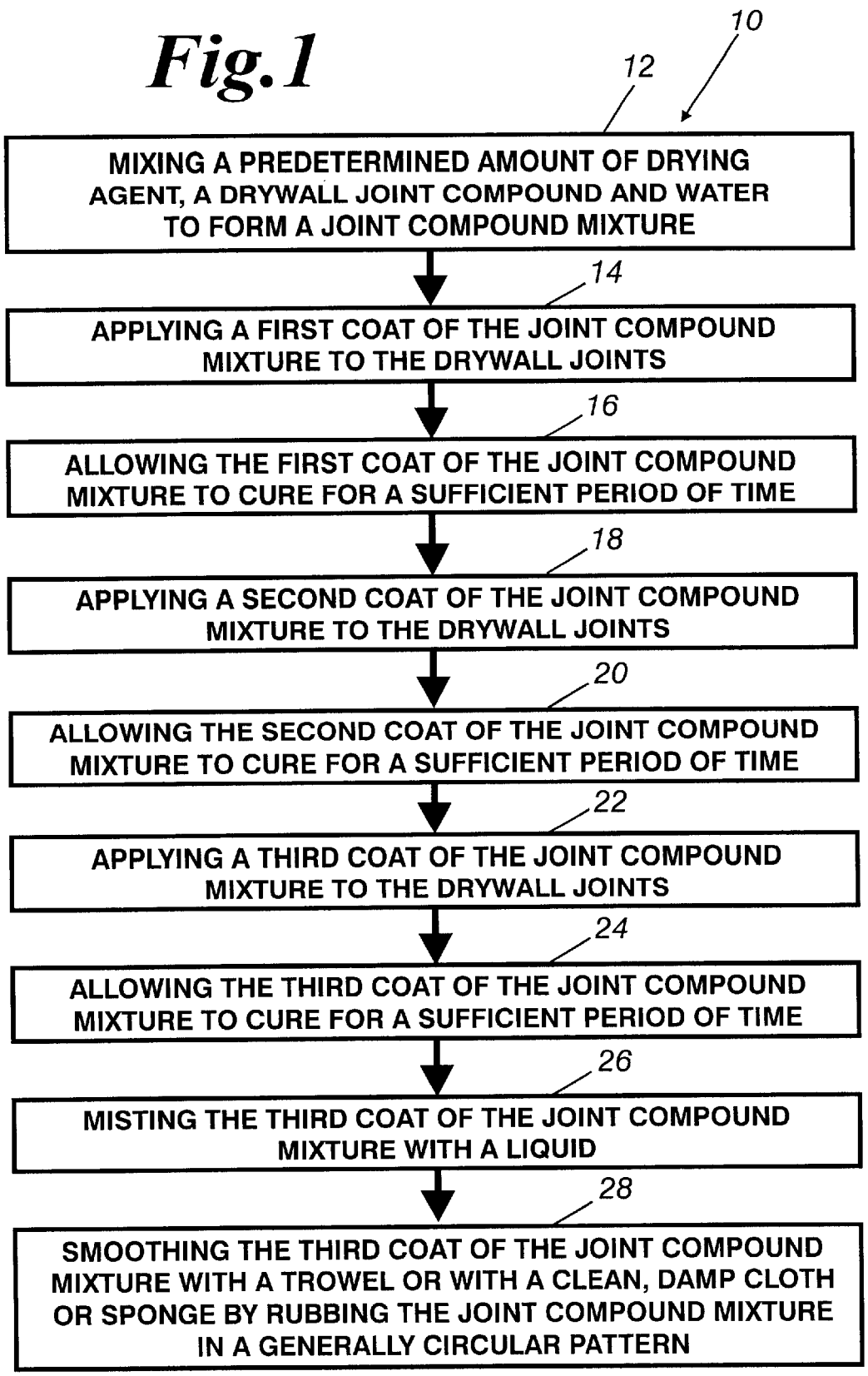

METHOD OF CURING DRYWALL COMPOUND

CROSS REFERENCE TO RELATED APPLICATIONS

This application claims the benefit of U.S. Provisional Patent Application Ser. No. 60/090,510, filed Jun. 24, 1998 abandoned, the disclosure of which is expressly incorporated herein.

FIELD OF THE INVENTION

The present invention relates generally to drywall joint compound and, more particularly, to a method of reducing the time required to finish drywall joints or to repair plaster walls using ready-mixed drywall joint compound.

BACKGROUND OF THE INVENTION

Gypsum board, also known as sheetrock or drywall, is widely used in the construction, remodeling and repair of residential homes, commercial buildings, and the like. Drywall is available in various sizes, such as 4×8 foot or 4×12 foot sheets that are typically ½ or ⅝ inches thick. The drywall is generally attached to the wood or steel studs of the infrastructure by nails or screws. Because joints are formed when the drywall is hung, these joints must be covered using drywall joint compound and drywall tape in order to provide an acceptable finish before paint or wallpaper is applied to the walls.

Conventional drywall joint compound is available in dry powder or "ready-mixed" form. Commonly available ready-mixed drywall joint compound products include SHEETROCK® All Purpose Joint Compound, which is available from United States Gypsum Company of Chicago, Ill., and GOLD BOND® All Purpose Ready Mix Joint Compound, which is available from National Gypsum Company of Charlotte, N.C. SHEETROCK® brand joint compound consists primarily of the following ingredients: (1) limestone, chemically known as calcium carbonate ($CaCO_3$), or dolomite ($CaMg(CO_3)_2$) or gypsum ($CaSO_4.2H_2O$); (2) water; (3) mica (silicates of varying chemical composition); (4) ethylene-vinyl acetate polymer or vinyl acetate polymer; (5) attapulgite clay (hydrated aluminum silicates); and (6) trace amounts of vinyl acetate monomer, acetaldhyde and crystallized silicon dioxide (quartz). United States Gypsum SHEETROCK® may also include talc (a hydrous magnesium silicate) and pyrophyllite. National Gypsum GOLD BOND® brand joint compound consists primarily of the following ingredients: (1) calcium carbonate; (2) quartz; and (3) water. GOLD BOND® may also include mica, talc, perlite, attapulgite clay, various polymers and various monomers.

The conventional procedure for finishing drywall joints is well known in the art.

Typically, the ready-mixed joint compound already contains the proper amount of water. If not, water can be added to the drywall joint compound to produce the desired consistency for a particular application. Regardless, the joint compound should be stirred vigorously before applying it to the drywall. A 4 to 6 inch joint finishing knife is used to place a first coat of joint compound in the joint. Drywall tape is placed over the joint and pressed into the joint compound using the knife. Usually, about 24 hours must be allowed for the first coat to dry thoroughly. A second coat of joint compound is applied over the first coat that extends a few inches beyond the edges of the tape on both sides. Again, the second coat usually requires about 24 hours to dry thoroughly. A 10-inch joint finishing knife is then used to apply a third and final coat. The total width of the third coat is typically about 12–14 inches. After the final coat dries, it is sanded to a smooth finish and any dust is wiped off prior to painting or applying wallpaper. Nail holes are also filled in with the joint compound and sanded, as necessary.

A major disadvantage of the conventional method for finishing drywall joints is the extended time that is required for the drywall joint compound to dry thoroughly. Because of the 24-hour drying time required between coats, the overall time needed to finish drywall joints is significant, typically two or more days. If necessary, sanding the final coat of the drywall joint compound further increases the overall time needed to finish the drywall joints. Additionally, sanding creates a potential health hazard due to the significant amount of dust generated during the sanding process. Therefore, a method of reducing the drying, or curing, time of the drywall joint compound and of eliminating the need for sanding the final coat would be a great improvement over the art. Such a method would reduce drywall construction labor costs and reduce overall drywall construction time. The method would be especially valuable in remodeling and repairing buildings which must be occupied during the remodeling or repair process.

SUMMARY OF THE INVENTION

It is therefore an object of the present invention to provide a method for reducing the curing time of drywall joint compound in order to minimize the time required to finish drywall joints and to repair plaster walls using drywall joint compound.

It is another object of the present invention to provide a method for eliminating the need for sanding the final coat of drywall joint compound, thereby eliminating a potential health hazard.

These and other objects are provided by a method, according to the present invention, of reducing the time required to finish drywall joints using drywall joint compound which comprises the step of mixing a predetermined amount of a drying agent to ready-mixed drywall joint compound, or to drywall joint compound with the proper amount of water added, to reduce the curing time of the drywall joint compound. In a preferred embodiment, the drying agent is selected from a mixture of the group of compounds consisting of plaster of Paris, calcium carbonate, gypsum, crystallized silicon dioxide (quartz), Portland cement, perlite, lime, hydroxy ethyl ether of cellulose, polyvinyl alcohol, starch, wood fiber, potassium naphthalene sulfon, aluminum sulfate, sodium citrate, ammonium tartrate, hydrolyzed protein, monosodium phosphate, sodium naphthalene sulfonate, potassium sulfate and various trace materials.

In a preferred embodiment of the invention, plaster of Paris is selected as the drying agent to be mixed with the drywall joint compound. A small amount of water may be added to facilitate the mixing process without adversely affecting the curing time. In another preferred embodiment, the drying agent is a mixture of plaster of Paris and quartz. Again, a small amount of water may be added to facilitate the mixing process without adversely affecting the curing time. The drying agent mixture preferably comprises about 80 parts plaster of Paris and about 1 part quartz, preferably in powdered form. A commercially available example of such a drying agent mixture is GOLD BOND® Moulding Plaster sold by Gold Bond Building Products, a division of National Gypsum Company of Charlotte, N.C. The drying agent mixture may further comprise perlite or Portland cement, or both.

In another preferred embodiment, a plaster of Paris and calcium carbonate mixture in the form of a moulding plaster is selected as the drying agent for mixing with the drywall joint compound. Again, a small amount of water may be added to facilitate the mixing process without adversely affecting the curing time. In this preferred embodiment, the drying agent mixture comprises at least about 80 parts plaster of Paris and less than about 5 parts calcium carbonate. A commercially available example of such a drying agent is USG® Moulding Plaster sold by United States Gypsum Company of Chicago, Ill. The drying agent mixture may further comprise less than about 5 parts of Portland cement, less than about 3 parts lime and less than about 2 parts each of hydroxy ethyl ether of cellulose, polyvinyl alcohol, starch and wood. The drying agent mixture may further comprise less than about 1 part each of potassium naphthalene sulfon, aluminum sulfate, sodium citrate, ammonium tartrate, hydrolyzed protein, monosodium phosphate, sodium naphthalene sulfonate, potassium sulfate and methylhydroxypropyl cellulose. The drying agent mixture may further comprise trace amounts each of calcium lignosulfonate, sodium potassium tartrate, tributyl phosphate and alkyl ether sulfate.

According to one preferred embodiment of the method of the present invention, about 1 pound of the drying agent is mixed with between about 5 to about 50 pounds of drywall joint compound, and preferably with about 26 pounds of drywall joint compound. Water is then added as necessary to facilitate mixing the drying agent into the drywall joint compound to form a homogenous mixture. Preferably, about 1 to about 10 fluid ounces of water is added for each pound of drying agent that is mixed with the drywall joint compound. The drying agent, joint compound, and water are then thoroughly mixed until the homogeneous joint compound mixture has the desired consistency to be applied to the drywall joints.

After mixing the drying agent, water, and joint compound in the proper proportions, the resulting joint compound mixture is applied to the joints, holes, and cracks in the drywall or to plaster walls in a manner that is well known in the art. Using this method reduces the curing time of the drywall joint compound, thereby minimizing the time required to finish the drywall joints. As will be described hereinafter, the method of the present invention also eliminates the need for sanding the final coat of the drywall joint compound, thereby eliminating a potential health hazard. Instead of sanding, the final coat of the joint compound mixture may be finished by applying a fine mist of water to the final coat and smoothing, or blending, the joint compound mixture with the drywall using a conventional trowel.

BRIEF DESCRIPTION OF THE DRAWING

The aforementioned objects and others will become more readily apparent by referring to the following detailed description and the appended drawings in which:

FIG. 1 is a flow chart of a preferred embodiment of a method of reducing the time required to finish drywall joints according to the present invention.

DETAILED DESCRIPTION OF THE PREFERRED EMBODIMENTS

The present invention will now be described more fully hereinafter by illustration of preferred embodiments of the invention. The invention, however, may be embodied in many different forms, and thus, should not be construed as limited to the particular embodiments illustrated herein. The description of the preferred embodiments illustrated herein is provided so that this disclosure will be both thorough and complete, and so that those skilled in the art of construction, remodeling and repair of drywall and plaster walls will be enabled to make and practice the invention.

The method according to the present invention comprises adding a predetermined amount of a drying agent to drywall joint compound to reduce the curing time of the drywall joint compound from about 48 hours to about 1 to 2 hours. The drying agent is selected from a mixture of the group of compounds consisting of plaster of Paris, calcium carbonate, gypsum, crystallized silicon dioxide (quartz), Portland cement, perlite, lime, hydroxy ethyl ether of cellulose, polyvinyl alcohol, starch, wood fiber, potassium naphthalene sulfon, aluminum sulfate, sodium citrate, ammonium tartrate, hydrolyzed protein, monosodium phosphate, sodium naphthalene sulfonate, potassium sulfate and various trace materials, or mixtures thereof. The drying agent is mixed with a conventional ready-mixed drywall joint compound (i.e., drywall joint compound with the proper amount of water already added) to produce a joint compound mixture having a greatly reduced curing time, thereby minimizing the time required to finish drywall joints and to repair plaster walls.

It has been discovered that a preferred embodiment of such a joint compound mixture comprises plaster of Paris ($2CaSO_4 \cdot H_2O$) as the drying agent. Plaster of Paris is a semi-hydrated, or dehydrated, form of calcium sulfate, typically formed by calcining conventional gypsum. A sufficient amount of water may also be added to facilitate mixing the drying agent and the drywall joint compound together to form a homogeneous joint compound mixture of the desired consistency for applying the joint compound mixture to drywall or to a plaster wall using a conventional trowel. The additional water does not adversely affect the curing time of the joint compound mixture.

Another preferred embodiment of the joint compound mixture comprises plaster of Paris and crystallized silicon dioxide (quartz) as the drying agent. Preferably, the quartz is provided in powdered form and a sufficient amount of water is added to facilitate mixing the drying agent and the drywall joint compound together to form a homogeneous mixture of the desired consistency for applying the joint compound mixture to drywall or to a plaster wall using a conventional trowel. The additional water does not adversely affect the curing time of the joint compound mixture. More specifically, the drying agent comprises about 1 part quartz to about 80 parts plaster of Paris. A plaster of Paris product sold by Gold Bond Building Products, a division of National Gypsum Company, under the trade name GOLD BOND® Moulding Plaster contains these particular ingredients in the preferred proportions. However, because plaster of Paris is a semi-hydrated calcium sulfate, any slightly hydrated form of calcium sulfate may be used alone or in combination with silica according to this preferred embodiment of the method. It is believed that the reduced curing time of the joint compound mixture results from the addition of dehydrated calcium sulfate to the hydrated calcium sulfate in the drywall joint compound. The powdered quartz appears to provide body to the mixture to minimize sagging.

Another preferred embodiment of the joint compound mixture comprises plaster of Paris and calcium carbonate in the form of a moulding plaster as the drying agent for mixing with the drywall joint compound. Again, a small amount of water may be added to facilitate mixing the drying agent and the drywall joint compound together to form a homogeneous mixture of the desired consistency for applying the joint compound mixture to drywall or to a plaster wall using a conventional trowel. The additional water does not adversely affect the curing time of the joint compound mixture. In this preferred embodiment, the drying agent comprises at least about 80 parts plaster of Paris and less than about 5 parts calcium carbonate. A plaster of Paris product sold by United States Gypsum Company of Chicago, Ill., under the trade name USG® Moulding Plaster contains these particular ingredients in the preferred proportions. The drying agent may further comprise less than about 5 parts of Portland cement, less than about 3 parts lime and less than about 2 parts each of hydroxy ethyl ether of cellulose, polyvinyl alcohol, starch and wood. The drying agent may further comprise less than about 1 part each of potassium naphthalene sulfon, aluminum sulfate, sodium citrate, ammonium tartrate, hydrolyzed protein, monosodium phosphate, sodium naphthalene sulfonate, potassium sulfate and methylhydroxypropyl cellulose. The drying agent may further comprise trace amounts each of calcium lignosulfonate, sodium potassium tartrate, tributyl phosphate and alkyl ether sulfate.

The preferred ratio of the drying agent to the drywall joint compound is about 1 pound of drying agent to between about 5 to about 50 pounds drywall joint compound, and preferably to about 26 pounds of the drywall joint compound. Water may then be added to the drying agent and the drywall joint compound to form the joint compound mixture. Preferably, a sufficient amount of water is added to the drying agent and drywall joint compound to facilitate mixing and to prevent the joint compound mixture from becoming so dry when exposed to ambient conditions that the mixture cannot be applied properly to drywall or to a plaster wall. Accordingly, about 1 to about 10 fluid ounces of water may be added to each pound of drying agent that is mixed with the drywall joint compound. The drying agent, joint compound, and water are mixed thoroughly to form the joint compound mixture, which is then applied to the drywall or to the plaster wall as will be described.

Because of the reduced curing time, and hence the reduced pot life, of the joint compound mixture, only about three-fourths of a normal sized joint compound pan, typically about 6.5 pounds, need be prepared for small jobs. The joint compound mixture should then be applied to the drywall or plaster wall as quickly as possible to prevent clumping of the joint compound mixture as it is applied, or cracking of the joint compound mixture as it dries. For example, only about four ounces of the drying agent comprising plaster of Paris and powdered quartz should be mixed with about 6.25 pounds of conventional drywall joint compound to form enough joint compound mixture to fill three-fourths of a normal sized joint compound pan. The plaster of Paris and quartz comprising the drying agent are preferably well mixed with each other prior to being mixed with the drywall joint compound. About two ounces of water may also be added to the drying agent and drywall joint compound. The water, drying agent, and joint compound are then thoroughly mixed. The resulting joint compound mixture is then ready for application to the drywall or to a plaster wall as will be described.

Set forth in Table 1 provided below are various formulations of water, drying agent, and drywall joint compound that can be used with the method of the present invention for different drywall applications. For example, the first formulation may be used when filling deep holes. The second formulation may be used for small jobs, for example, when only one pan (about 6.5 pounds) of joint compound is needed. The third through fifth formulations may be used for larger jobs. As previously discussed, the preferred drying agent comprises plaster of Paris and other ingredients. Specifically, GOLD BOND® Moulding Plaster or USG® Moulding Plaster contain sufficient amounts of plaster of Paris and may be used as the drying agent for the formulations set forth in Table 1.

Table 1 shows the amount of water in fluid ounces, the amount of drying agent (e.g., plaster of Paris and quartz mixture) in pounds, the amount of drywall joint compound in pounds, and the approximate curing time (i.e., pot life) of the resulting joint compound mixture in minutes.

TABLE 1

| No. | Water (fl. oz.) | Drying Agent (lbs.) | Joint Compound (lbs.) | Curing Time (mins.) |
| --- | --- | --- | --- | --- |
| 1 | 1 | 0.22 | 1.5 | 20 |
| 2 | 2 | 0.22 | 6.5 | 45 |
| 3 | 9 | 1.31 | 30 | 60 |
| 4 | 18 | 3.50 | 30 | 15 |
| 5 | 18 | 2.63 | 60 | 60 |

As can be seen from the first and second formulations of Table 1, increasing the amount of water added in proportion to the amount of drying agent, increases the curing time of the resulting joint compound mixture. Similarly, as can be seen from the third and fourth formulations of Table 1, increasing the amount of drying agent in proportion to the water, decreases the curing time of the joint compound mixture. Accordingly, it can be seen that Table 1 lists only five of the many possible formulations that can be prepared to accommodate the various needs and requirements of finishing drywall joints and repairing plaster walls.

In general, effective joint compound mixtures may be prepared according to the present invention by mixing about 1 pound of drying agent to between about 5 to about 50 pounds of drywall joint compound. Water is then mixed with the drying agent and drywall joint compound to meet the particular requirements of the desired application for the resulting joint compound mixture. Preferably, a sufficient amount of water is added to the drying agent and drywall joint compound to facilitate mixing and to prevent the mixture from becoming so dry that the joint compound mixture cannot be applied properly or so that the mixture clumps as it is being applied to the drywall or to the plaster wall. Accordingly, about 1 to about 10 fluid ounces of water may be added to each pound of drying agent that is mixed with the drywall joint compound. The drying agent, drywall joint compound and water are then mixed thoroughly to form the joint compound mixture and thereafter applied to the drywall as will be described.

Once the joint compound mixture is prepared, it may be applied to the drywall by techniques that are well known in the art except that the second and third coats of the joint compound mixture may be applied more quickly. That is, the second coat may be applied within about 2 hours after applying the first coat. Similarly, the third coat may be applied within about 2 hours of applying the second coat. The surface temperature of the drywall should preferably be above about 55° F. for proper application. Thus, drywall joints may be finished according to the method, indicated generally by reference numeral 10 in FIG. 1, of the present invention by the following steps. In step 12 the drying agent, drywall joint compound and water are mixed together in the desired proportions to form the joint compound mixture. In step 14 a first coat of the joint compound mixture is applied to the drywall joints. In step 16 the first coat of the joint compound mixture is allowed to cure for a sufficient period of time, typically between about 20 minutes and about 2 hours. Preferably, however, the joint compound mixture is allowed to cure for a period of between about 30 and about 45 minutes.

In step 18 a second coat of the joint compound mixture is applied to the drywall joints. In step 20 the second coat of the joint compound mixture is allowed to cure for a sufficient period of time similar to the first coat. In step 22 a third coat of the joint compound mixture is applied to the drywall joints. In step 24 the third coat of the joint compound mixture is allowed to cure for a sufficient period of time similar to the first and second coats. Finally, in steps 26 and 28 the third coat of the joint compound mixture is misted with a liquid, preferably water, and smoothed with a conventional trowel. The final step 28 may also be accomplished by smoothing the third coat of the joint compound mixture with a clean, damp cloth or sponge, preferably by rubbing the joint compound mixture in a generally circular pattern.

It should be noted that the second and third coats may be applied before the preceding coat is completely dry. In fact, in one preferred embodiment the preceding coat of the joint compound mixture need only be set before applying the subsequent coat. It should also be noted that any flaws remaining in the third coat after trowelling may be removed by wiping, preferably in a circular motion, the surface of the final coat with a clean, damp cloth or sponge. Thus, the finished drywall joints may be painted in about 24 hours after applying the first coat.

While the method set forth above is described in conjunction with ready-mixed drywall joint compound, that is, drywall joint compound already having the proper amount of water added, the method of the present invention may also be used with drywall joint compound that has not been ready-mixed. According to this method, the proper amount of water should be added to the drywall joint compound according to the manufacturer's instructions prior to mixing the drywall joint compound with the drying agent. The method as outlined above for ready-mixed drywall joint compound is then followed and the resulting joint compound mixture is applied to the drywall or to the plaster wall as described above.

As described above, the present invention provides a method of reducing the curing time of joint compound, thereby reducing the time required for finishing drywall. Additionally, the method of the present invention eliminates the need for dry sanding the final coat of joint compound, which is also time consuming and creates a potential health hazard. By eliminating the need for sanding, the method also eliminates the dust generated by the sanding process. Instead of dry sanding, the final coat of joint compound can be finished with a trowel using a fine mist of water or by rubbing the joint compound with a clean, damp cloth or sponge.

In the specification, there has been set forth preferred embodiments of the present invention and although specific terms are employed, the terms are used in a generic descriptive sense only and not for the purpose of limiting the scope of the invention as set forth in the following claims. Accordingly, the scope of the present invention should be construed broadly to include all equivalent embodiments within the ordinary skill of those proficient in the art of construction, remodeling and repair of drywall and plaster walls.

That which is claimed is:

1. A method of reducing the curing time of ready-mixed, drying type drywall joint compound comprising the step of
   mixing a predetermined amount of a drying agent comprising plaster of Paris with the drywall joint compound at the time of application to form a joint compound mixture that cures in substantially less time than the drywall joint compound.

2. The method of claim 1 comprising the further step of
   adding a sufficient amount of water to the mixture of the drying agent and the drywall joint compound to facilitate the step of mixing.

3. The method of claim 1 wherein the drying agent to be mixed with the drywall joint compound further comprises quartz.

4. The method of claim 3 wherein the drying agent comprises a mixture of about 80 parts plaster of Paris and about 1 part quartz.

5. The method of claim 4 wherein the drying agent to be mixed with the drywall joint compound further comprises perlite.

6. The method of claim 4 wherein the drying agent to be mixed with the drywall joint compound further comprises Portland cement.

7. The method of claim 1 wherein the drying agent to be mixed with the drywall joint compound further comprises calcium carbonate.

8. The method of claim 7 wherein the drying agent comprises a mixture of about 80 parts plaster of Paris and less than about 5 parts calcium carbonate.

9. The method of claim 8 wherein the drying agent to be mixed with the drywall joint compound further comprises less than about 5 parts of Portland cement, less than about 3 parts lime and less than about 2 parts each of hydroxy ethyl ether of cellulose, polyvinyl alcohol, starch and wood.

10. The method of claim 8 wherein the drying agent to be mixed with the drywall joint compound further comprises less than about 1 part each of potassium naphthalene sulfon, aluminum sulfate, sodium citrate, ammonium tartrate, hydrolyzed protein, monosodium phosphate, sodium naphthalene sulfonate, potassium sulfate and methylhydroxypropyl cellulose.

11. The method of claim 8 wherein the drying agent to be mixed with the drywall joint compound further comprises trace amounts each of calcium lignosulfonate, sodium potassium tartrate, tributyl phosphate and alkyl ether sulfate.

12. The method of claim 1 wherein the step of mixing comprises
   mixing about 1 pound of the drying agent with between about 5 to about 50 pounds of drywall joint compound.

13. The method of claim 1 wherein the step of mixing comprises mixing about 1 pound of the drying agent with about 26 pounds of drywall joint compound.

14. A method of reducing the time required to finish drywall joints comprising the steps of
   mixing a predetermined amount of a drying agent comprising plaster of Paris with a ready-mixed drying type drywall joint compound at the time of application to form a joint compound mixture that cures in substantially less time than the drywall joint compound;
   applying a first coat of the joint compound mixture to the drywall joints;
   allowing the first coat of the joint compound mixture to cure for a period of between about 20 minutes and about 2 hours;

applying a second coat of the joint compound mixture to the drywall joints;

allowing the second coat of the joint compound mixture to cure for a period of between about 20 minutes and about 2 hours;

applying a third coat of the joint compound mixture to the drywall joints; and allowing the third coat of the joint compound mixture to cure for a period of between about 20 minutes and about 2 hours.

15. The method of claim 14 wherein the step of mixing further comprises adding a sufficient amount of water to the mixture of the drying agent and the drywall joint compound to facilitate the step of mixing.

16. The method of claim 14 comprising the further steps of misting the third coat of the joint compound mixture with a liquid; and smoothing the third coat of the joint compound mixture with a trowel and without dry sanding.

17. The method of claim 14 comprising the further steps of misting the third coat of the joint compound mixture with a liquid; and smoothing the third coat of the joint compound mixture with a clean, damp cloth by rubbing the joint compound mixture in a generally circular pattern and without dry sanding.

* * * * *